US012652073B2

(12) United States Patent
Thepaut et al.

(10) Patent No.: US 12,652,073 B2
(45) Date of Patent: Jun. 9, 2026

(54) HIGH-SPEED WIRELESS DATA TRANSFER DEVICE FOR DATA MANAGEMENT DEVICES

(71) Applicant: EASII IC, Grenoble (FR)

(72) Inventors: Yannick Thepaut, Voreppe (FR);
Jean-Paul Goglio, Pontcharra (FR);
Steven Huet, Grenoble (FR)

(73) Assignee: EASII IC, Grenoble (FR)

( * ) Notice: Subject to any disclaimer, the term of this patent is extended or adjusted under 35 U.S.C. 154(b) by 742 days.

(21) Appl. No.: 17/906,556

(22) PCT Filed: Mar. 17, 2021

(86) PCT No.: PCT/FR2021/050439
§ 371 (c)(1),
(2) Date: Dec. 12, 2022

(87) PCT Pub. No.: WO2021/186130
PCT Pub. Date: Sep. 23, 2021

(65) Prior Publication Data
US 2023/0095047 A1 Mar. 30, 2023

(30) Foreign Application Priority Data
Mar. 17, 2020 (FR) ...................................... 2002592

(51) Int. Cl.
*H04B 1/40* (2015.01)
*H04B 7/15* (2006.01)
(52) U.S. Cl.
CPC .................. *H04B 1/40* (2013.01); *H04B 7/15* (2013.01)

(58) Field of Classification Search
CPC .. H04B 7/0695; H04B 7/0626; H04B 7/0617; H04B 7/088; H04B 1/40; H04B 17/3913;
(Continued)

(56) References Cited

U.S. PATENT DOCUMENTS

| | | | | |
|---|---|---|---|---|
| 2002/0049778 | A1* | 4/2002 | Bell ....................... | G06Q 10/00 |
| 2009/0313432 | A1* | 12/2009 | Spence ............... | G06F 16/4387 |
| | | | | 711/115 |

(Continued)

FOREIGN PATENT DOCUMENTS

FR 3019955 A1 10/2015

OTHER PUBLICATIONS

Hans Kristian Soltveit, "Multi-Gigabit Wireless Data Transfer for High Energy Physics Applications OnbehalfoftheWADAPTWorking-Group WirelessAllowingDataAndPowerTransmission", Jan. 1, 2017, URL:https://indico.cern.ch/event/466934/contributions/2590722/attachments/1488486/2312654/EPS-HEP2017.pdf XP055755896.

(Continued)

*Primary Examiner* — Ajibola A Akinyemi
(74) *Attorney, Agent, or Firm* — CANTOR COLBURN LLP

(57) ABSTRACT

A high-speed wireless data transfer device for data management devices, includes a first transfer module and a second transfer module able to exchange wirelessly between them, by microwave radio signals with a frequency greater than 50 Gigahertz, and a monolithic microwave integrated circuit. The device further includes at least one mass storage element capable of supplying or storing the transfer data with a rate greater than 1 gigabit per second when the distance separating the first transfer module and the second transfer module transfer is less than a predetermined distance; and a control device configured to control the monolithic microwave integrated circuit, the mass storage element and a communication bus connected to the mass storage element.

20 Claims, 3 Drawing Sheets

(58) Field of Classification Search
CPC .......... H04B 7/0408; H04B 7/10; H04B 7/15;
H04B 7/155; H04B 7/1858; H04B
7/18591
USPC ........................................................ 455/73
See application file for complete search history.

(56) References Cited

U.S. PATENT DOCUMENTS

| | | | |
|---|---|---|---|
| 2010/0138572 A1* | 6/2010 | Rofougaran .......... | G06F 13/385 |
| | | | 710/106 |
| 2012/0098708 A1 | 4/2012 | Takasu | |
| 2016/0070313 A1* | 3/2016 | Wu .................. | G06K 19/07732 |
| | | | 361/679.32 |

OTHER PUBLICATIONS

International Search Report issued Jun. 8, 2021 re: Application No. PCT/FR2021/050439; pp. 1-3; citing: US 20100138572 A1, US 20120098708 A1, FR 3019955 A1 and Solveit, "Multi-Gigabit Wireless Data Transfer . . . ".

* cited by examiner

HIGH-SPEED WIRELESS DATA TRANSFER DEVICE FOR DATA MANAGEMENT DEVICES

CROSS REFERENCE TO RELATED APPLICATIONS

This application is a National Stage of PCT Application No. PCT/FR2021/050439, filed on Mar. 17, 2021, which claims priority to French Patent Application No. 2002592, filed on Mar. 17, 2020, the contents of each of which are incorporated herein by reference thereto.

TECHNICAL FIELD

The present disclosure concerns a high-speed wireless data transfer device for data management devices.

The disclosure also relates to a high-speed wireless data transfer system for data management devices comprising such a high-speed wireless data transfer device.

The disclosure also relates to a high-speed wireless data transfer assembly comprising at least one data management device and such a high-speed wireless data transfer device.

BACKGROUND

In the field of high-speed wireless data transfer devices for data management devices, such as computers or smartphones, there are systems involving a two-way wireless link, for example the Wi-Fi or Bluetooth protocols. This link can be implemented between two data management devices.

However, these types of links cannot transfer amounts of data greater than several gigabytes in less than a few minutes. Even larger amounts of data take several tens of minutes to be transferred.

Another disadvantage is that these links are not secure and can in particular be diverted with a view to pirating actions.

SUMMARY

The present disclosure aims to respond to all or part of the problems presented above.

In particular, a goal is to provide a solution that meets at least one of the following advantages:

allow satisfactory data transmission in terms of speed between two data management devices;

allow secure data transmission between two data management devices.

This can be achieved by providing a high-speed wireless data transfer device for data management devices, comprising a first transfer module and a second transfer module, capable of exchanging wirelessly with each other, by microwave radio signals with a frequency greater than 50 Gigahertz, transfer data with a transfer rate greater than 1 Gigabit per second when the distance separating the first transfer module and the second transfer module is less than a predetermined distance, each transfer module comprising:

a monolithic microwave integrated circuit capable of carrying out at least one basic operation among a modulation of said microwave radio signals, a demodulation of said microwave radio signals, a transmission of said microwave radio signals and a reception of said microwave radio signals via an antenna, respectively to or from, a different transfer module selected among the first transfer module and the second transfer module, said at least one basic operation being carried out with a rate greater than 1 gigabit per second;

at least one mass storage element capable of supplying or storing the transfer data respectively to or from the monolithic microwave integrated circuit with a rate greater than 1 gigabit per second;

the monolithic microwave integrated circuit on the one hand integrating, during the basic operation of modulating said microwave radio signals, the transfer data coming from the mass storage element into the microwave radio signals and on the other hand extracting the transfer data from said microwave radio signals during the basic operation of demodulating the microwave radio signals, so that the transfer data are usable by the mass storage element;

a control device configured to control on the one hand the monolithic microwave integrated circuit so that it carries out at least one of the basic operations and on the other hand the mass storage element so that it provides or to store the transfer data respectively to or from the monolithic microwave integrated circuit;

a communication bus connected to the mass storage element, able to allow connection of said transfer module to a data management device and able to pass the transfer data from the mass storage element to the device data management device and from the data management device to the mass storage element.

Some preferred but non-limiting aspects of this device are as follows.

In an implementation of the data transfer device, the mass storage element of each transfer module is dedicated to the only storage of the transfer data.

In an implementation of the data transfer device, the mass storage element is a NAND type memory.

In an implementation of the data transfer device, the data transfer device includes a power supply device internally arranged to at least one of the first and second transfer modules, at least one of the first and second transfer modules being electrically powered by the power supply device.

In an implementation of the data transfer device, at least one of the transfer modules is configured to be electrically powered by an electrical power supply device external to said transfer module and coming from a data management device.

In an implementation of the data transfer device, each of the transfer modules comprises at least one communication port capable of being connected to a data management device and configured to pass the transfer data between the communication bus and the data management device to which the communication port is connected.

In an implementation of the data transfer device, each of the transfer modules comprises a first communication port of the micro-USB type, a second communication port of the USB 3.0 type, a third communication port of the Lightning© type and a fourth communication port of the USB-C type.

In an implementation of the data transfer device, the modulation of the microwave radio signals, and the demodulation of the microwave radio signals are carried out according to a protocol of amplitude shift modulation.

In an implementation of the data transfer device, the frequency of the microwave radio signals is 60 GHz.

In an implementation of the data transfer device, the microwave radio signals are modulated according to a protocol different from a normative standard.

In an implementation of the data transfer device, at least one of the transfer modules selected among the first transfer module and the second transfer module is arranged inside one of the data management devices In an implementation of the data transfer device, the mass storage element has a capacity greater than or equal to 64 GB.

In an implementation of the data transfer device, the mass storage element of each transfer module is different from a non-volatile memory belonging to the data management device to which said transfer module is able to be connected, the control device of said transfer module having no access to said non-volatile memory, each transfer module being configured so that its mass storage element is accessible by a data selection device belonging to said data management device or said transfer module, the data selection device also having access to said non-volatile memory when said transfer module and said data management device are connected.

In an implementation of the data transfer device, the first and second transfer modules are configured to autonomously establish a wireless link between them when the transfer data have to be transferred and when the first and second transfer modules are separated by a distance less than the predetermined distance.

This can be further achieved by providing a high-speed wireless data transfer system for data management devices, comprising:

at least one such high-speed wireless data transfer device whose first transfer module is connected at least via its communication bus to a first data management device and whose second transfer module is connected to at least one device selected from a second data management device and a power supply device;
  a first data selection device configured:
  to perform a data primary selection from a general set of data of the first data management device;
  so that the data of the primary selection can pass from the first data management device to the mass storage element of the transfer module, this transfer module being in particular the first transfer module, via the communication bus;
  to perform a secondary selection of transfer data from a set of transfer data stored on the mass storage element of the first transfer module;
  so that the transfer data of the secondary selection can pass from the mass storage element of the first transfer module to the first data management device via the communication bus of the first transfer module;
  so that the control device of the first transfer module to control the mass storage element and the monolithic microwave integrated circuit of the first transfer module so that the transfer data resulting from the secondary selection and stored in the mass storage of the first transfer module are transmitted by microwave radio signals to the second transfer module with a rate greater than 1 Gigabit per second;
  so that the transfer data coming from the first transfer module are received and processed by the monolithic microwave integrated circuit of the second transfer module and stored in its mass storage element.

Some preferred but non-limiting aspects of the system are as follows.

In an implementation of the system, the second transfer module is connected to the second data management device at least via its communication bus, the data transfer system comprising a second data selection device configured:

so that a tertiary selection of transfer data is possible among a set of transfer data stored on the mass storage element of the second transfer module;
  so that the transfer data of the tertiary selection can pass from the mass storage element of the second transfer module to the second data management device via the communication bus of the second transfer module.

In an implementation of the system, at least one of the data selection devices is installed on at least one among the first data management device, the second data management device, the first transfer module and the second transfer module.

In an implementation of the system, access to the general set of data of the first data management device is prohibited to the controlling device of the first transfer module.

This can also be achieved by providing a high-speed wireless data transfer assembly comprising at least one first data management device and at least one such high-speed wireless data transfer device, the first transfer module of which is arranged inside said first data management device so that the communication bus of the first transfer module is connected with said first data management device.

Some preferred but non-limiting aspects of the assembly are as follows.

In an implementation of the high-speed wireless data transfer assembly, the high-speed wireless data transfer assembly comprises a second data management device, the second transfer module of the high-speed wireless data transfer device is arranged in said second data management device.

The disclosure also relates to a method for transferring data between a first data management device, connected to a communication bus belonging to a first transfer module, and a second transfer module including a communication bus able to allow a connection of the second transfer module to a second data management device, the first and second transfer modules being capable of exchanging high-speed wireless with each other, by microwave radio signals with a frequency greater than 50 Gigahertz, transfer data with a transfer rate greater than 1 Gigabit per second when the distance separating the first transfer module and the second transfer module is less than a predetermined distance, the first and second transfer modules each including a mass storage element dedicated to the only storage of the transfer data, the transfer method including the following steps:

a step in which the transfer data pass, via the communication bus of the first transfer module, from the first data management device to the mass storage element to store the transfer data in said mass storage element of the first transfer module, said mass storage element of the first transfer module being connected to the communication bus of the first transfer module;
  a step of supplying the transfer data, with a rate greater than 1 gigabit per second, from the mass storage element of the first transfer module to a monolithic microwave integrated circuit belonging to the first transfer module;
  a modulating step, carried out with a rate greater than 1 gigabit per second, of said microwave radio signals by the monolithic microwave integrated circuit of the first transfer module, the monolithic microwave integrated circuit of the first transfer module integrating, during the modulation step, the transfer data coming from the mass storage element of the first transfer module in the microwave radio signals,
  a high-speed wireless transmission step, carried out with a rate greater than 1 gigabit per second, microwave radio signals modulated by the modulation step, the transmission step being implemented by the monolithic microwave integrated circuit belonging to the first transfer module;

a step of receiving the microwave radio signals emitted during the step of sending by a monolithic microwave integrated circuit belonging to the second transfer module, the receiving step being carried out with a rate greater than 1 gigabit per second;

a demodulation step, implemented by the monolithic microwave integrated circuit of the second transfer module of the received microwave radio signals, the demodulation step being carried out with a rate greater than 1 gigabit per second;

an extraction step, implemented by the monolithic microwave integrated circuit of the second transfer module during the demodulation step, of the transfer data from said microwave radio signals received so that the transfer data are usable by the mass storage element belonging to the second transfer module, the mass storage element of the second transfer module being connected to the communication bus of the second transfer module;

a step of storing the transfer data, coming from the monolithic microwave integrated circuit of the second transfer module, in the mass storage element of the second transfer module with a rate greater than 1 gigabit per second;

during the transmission step and during the reception step, the first and second transfer modules are separated from each other by a separation distance less than the predetermined distance.

In a particular implementation, the data transfer method is such that, prior to the step in which the transfer data pass from the first data management device to the mass storage element of the first transfer module, the transfer data are selected in a non-volatile memory belonging to the first data management device and distinct from the mass storage element.

BRIEF DESCRIPTION OF THE DRAWINGS

Other aspects, advantages, and characteristics of the disclosure will appear better on reading the following detailed description of preferred embodiments thereof, given by way of non-limiting example, and made with reference to the appended drawings on which.

DETAILED DESCRIPTION OF THE DRAWINGS

In the appended FIGS. 1 to 6 and in the remainder of the description, elements which are identical or similar in functional terms are identified by the same references. In addition, the various elements are not shown to scale so as to favour the clarity of the figures to facilitate the understanding. Furthermore, the different embodiments and variants are not mutually exclusive and can, on the contrary, be combined with each other.

In the following description, unless otherwise indicated, the terms «substantially», «approximately», «globally» and «in the range of» mean «within 10%».

The disclosure relates firstly to a high-speed wireless data transfer device 10 for data management devices D1, D2. By «high speed», it is understood here a data transfer rate greater than 0.5 Gigabit and more particularly than 1 Gigabit per second, such as for example greater than 6 Gigabits per second.

The data management devices D1, D2 are for example computers, smartphones, digital tablets, paper or 3D printers, or else external or internal hard disks.

Figure 6:
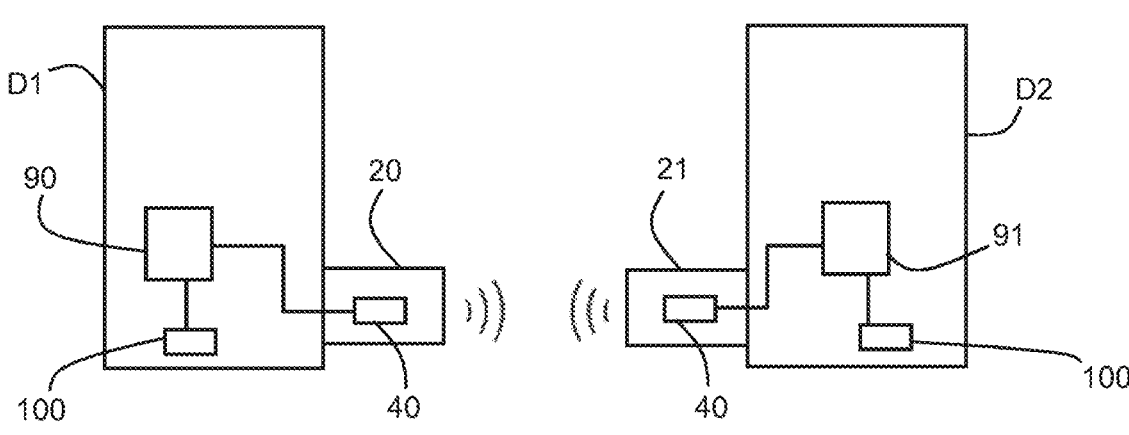
FIG. 6 illustrates a schematic view of a high-speed wireless data transfer assembly comprising a data management device and a high-speed wireless data transfer device according to a particular embodiment of the disclosure.

The data management devices D1, D2 can each include a non-volatile memory 100 in which data from said data management device D1, D2 (also called «general set of data from the data management device») are stored as shown for example in FIG. 6. For example, the data management devices D1, D2 can each include a data selection device 90, 91 which can be a native operating system of the data management device D1, D2 which can be controlled by a human-machine interface (whose known acronym is «HMI»), the operating system having for example access to the non-volatile memory 100 to allow the management of the data of the corresponding data management device D1, D2.

Figure 1:
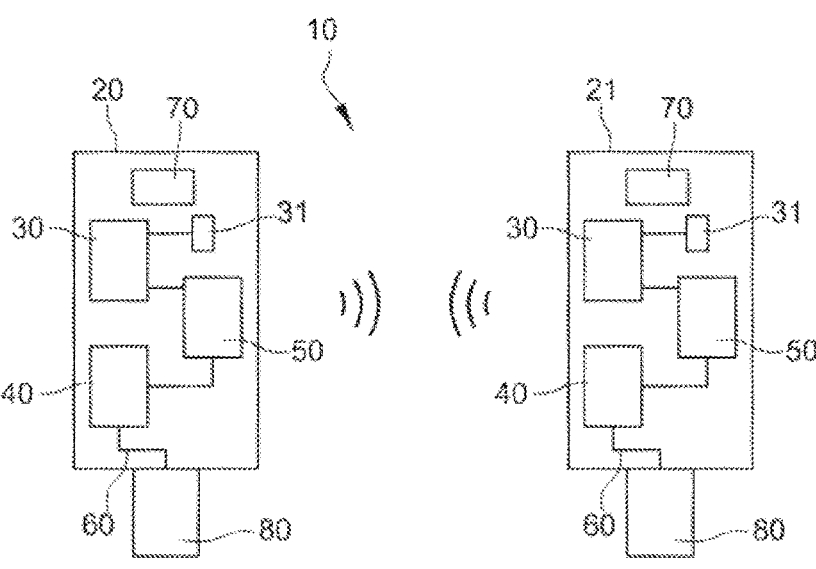
FIG. 1 illustrates a schematic view of a high-speed wireless data transfer device according to the disclosure having two transfer modules each with an external communication port.

As represented in FIG. 1, the high-speed wireless data transfer device 10 comprises at least one first transfer module 20 and one second transfer module 21. The two transfer modules 20, 21 communicate data one to the other potentially bidirectionally or interchangeably. In other words, the two transfer modules 20, 21 can, in turn, transmit or receive data towards each other. The first transfer module 20 and the second transfer module 21 communicate with each other by wireless microwave radio signals with a frequency greater than 50 Gigahertz, such as for example 60 Gigahertz. They are capable of exchanging between them, wirelessly, transfer data according to this same frequency band. In one example, the microwave radio signals were on a centred bandwidth on the base frequency. Thus, in one example, the base frequency is 60 GHz and the bandwidth is comprised between 57 and 64 GHz. The bandwidth depends in particular on the type of modulation and the standards. In the present text, the term frequency is understood to mean base frequency with extension to its bandwidth.

The data transfer rate is greater than 1 Gigabit per second when the distance separating the first transfer module 20 and the second transfer module 21 is less than 30 cm and more particularly less than 10 cm. Preferably, the data transfer rate is greater than 6 Gigabits per second to increase the speed of the transfer.

In other words, according to the disclosure, the first and second transfer modules 20, 21 are configured to communicate with each other only when they are separated from each other by a predetermined distance of less than 30 cm and more particularly less than 10 cm. Conversely, when the transfer modules 20, 21 are separated by a distance greater than said predetermined distance, the two transfer modules 20, 21 cannot communicate with each other. This is advantageous because security during data transfer is guaranteed. To exchange data, the two transfer modules 20, 21 must therefore be brought together to exchange data at high speed.

Outside this communication field of 30 cm or more particularly less than 10 cm, the waves become evanescent in a few centimetres, or the rate drops drastically as the transfer modules 20, 21 move away. This is advantageous because the security of the data transfer is therefore guaranteed. Indeed, hacking cannot take place discreetly because, to intercept the waves, an intruder would need to be within the field of action of these waves, which is only a few centimetres.

It can be provided in one example that several transfer modules can receive the transfer data from a single transfer module at the same time or that conversely a single transfer module can receive the data from several different transfer modules at the same time. This being possible only if the various transfer modules are all within a distance perimeter less than the predetermined distance of one or a few tens of centimetres.

An encoding or security device can be provided so that the connection and the transfer of data between the transfer modules 20, 21 can only take place with prior pairing or via a security protocol.

Each transfer module 20, 21 firstly comprises a monolithic microwave integrated circuit 30. This is able to perform at least one basic operation. The basic operations are for example:

a modulation of the microwave radio signals, a demodulation of the microwave radio signals, a transmission of the microwave radio signals, a reception of the microwave radio signals.

The basic operations are carried out with a rate greater than 1 Gigabit per second in order to limit the data transfer time as much as possible. It is advantageous to have a rate greater than 6 Gigabits per second to increase the speed of data transfer. This also has the advantage of limiting the hacking of the data during the transfer because the high speed of the transfer the possibilities of setting up hacking means.

The monolithic microwave integrated circuit 30 is for example produced with technologies of the 28 nanometer or lower node type and/or based on the FDSOI technology (from «Fully Depleted Silicon On Insulator»).

In one example, the modulation of the microwave radio signals and the demodulation of the microwave radio signals are carried out according to a protocol of amplitude shift modulation. An example of this type of modulation or demodulation is the ASK type of the denomination (amplitude-shift keying).

In another advantageous example, the modulation of the microwave radio signals and the demodulation of the microwave radio signals are carried out according to a single-phase modulation protocol.

In an example of implementation, it is possible to use the OOK «ON/OFF keeing» modulation. This allows that beyond the predetermined distance, the flow rate is suddenly reduced or even zero and that within the predetermined distance the flow rate is maximum. The overall implementation is simplified and consumption can potentially be reduced.

In another example of implementation, a phase shift modulation of the PSK «Phase shifting modulation» type can be implemented. It allows a more robust signal.

For the same purpose, a modulation of the QAM «Quadrature amplitude modulation» type makes it possible to further reinforce the robustness of the transfer signals.

An example of a monolithic microwave integrated circuit 30 which could be used is the «ST60A2G0» integrated circuit developed by the STMicroelectronics company.

In an example, due to their short range, the microwave radio signals transmitted by the transfer modules 20, 21 are modulated according to a protocol different from a normative standard such as for example that of the V band of the IEEE 802.11ad standard. This is advantageous because the transmit power can be higher than what is allowed for longer range transmission. An added benefit is that the cost is lower because certification is not required.

The first transfer module 20 may contain a first transmission module and a first reception module in order to respectively carry out the transmission to the second transfer module 21 and the reception of the microwave radio signals coming from the second transfer module 21.

Identically and interchangeably, the second transfer module 21 may contain a second transmission module and a second reception module in order to respectively carry out the transmission to the first transfer module 20 and the reception coming from the first transfer module 20 of the microwave radio signals coming from the first transfer module 20.

In an example of implementation of the high-speed wireless data transfer device 10, the first transfer module 20 and the second transfer module 21 are identical. This has the advantage that they are interchangeable and that there is no need to define a master transfer module in relation to a slave transfer module. Other advantages are that the transfer modules are thus easier to manufacture and to use due to their identical design.

The microwave radio signals are transmitted or received via an appropriate antenna 31. The antenna 31 is for example included in the electronic card which supports each transfer module 20, 21. The antenna 31 can also consist of a three-dimensional element placed on the electronic card such as for example a horn. The antenna is illustrated by way of example in FIG. 1 but it could also be illustrated and present in all the embodiments.

Each transfer module 20, 21 contains at least one mass storage element 40. The mass storage 40 is suitable for supplying or storing the transfer data respectively to or from the monolithic microwave integrated circuit 30. The transfer speed between these two elements is done with a rate greater than 0.5 Gigabit like for example greater than 1 Gigabit per second in order to limit the data transfer time as much as possible. This also has the advantage of limiting the hacking of the data during the transfer because the high speed of the transfer limits the possibilities of setting up hacking means.

In an example, the mass storage element 40 is a NAND type memory. In another example, the mass storage element 40 is a hard disk or a FLASH type memory. In another example, the mass storage element 40 has a capacity greater than or equal to 64 Gigabytes (GB) such as for example 128 GB.

For each transfer module 20, 21, the mass storage element 40 of said transfer module can be dedicated to the only storage of the transfer data. In other words, each transfer module 20, 21 can be configured so that its mass storage element 40 is dedicated to the only storage of the transfer data. By «dedicated to the only storage of transfer data», it is understood that this mass storage element 40 cannot end up in a state where data other than the transfer data (for example transfer data transferred and/or or to be transferred) would be stored there. Thus, the transfer data, in particular from one of the corresponding data management devices D1, D2, can be stored in the transfer module 20, 21 so that the sending of this data does not create a door having an access direct to the non-volatile memory 100 of this data management device D1, D2 storing data other than the transfer data. This has the advantage of improving data security by not directly exposing data that should not be transferred. From then on, whether before the transmission of the transfer data or after their reception, their storage in the mass storage elements 40 of the first and second transfer modules 20, 21 acting as a buffer memory with controlled access makes it possible to secure more generally other data from the data management devices D1, D2.

It follows from the preceding paragraph that, in an example where the data management devices D1, D2 each include the non-volatile memory 100, the mass storage element 40 is different from the non-volatile memory 100 thus allowing a separation to protect data other than the transfer data. This difference is notably such that the non-volatile memory 100 and the mass storage element 40 are:

distributed over two different storage media, also called storage devices, or on the same storage medium, but on two different partitions thereof, thus allowing the transfer modules 20, 21 to privately manage access to the transfer data by the monolithic microwave integrated circuit 30 during the transfer of these transfer data between the transfer modules 20, 21.

In an example, the mass storage element 40 is the same as that internal to the data management device D1, D2. This helps to limit costs.

The monolithic microwave integrated circuit 30 integrates, during the basic operation of modulating said microwave radio signals, the transfer data coming from the mass storage element 40 into the microwave radio signals. Conversely, it extracts the transfer data from said microwave radio signals during the basic operation of demodulating the microwave radio signals. Thus, the transfer data are usable and stored by the mass storage element 40.

Each transfer module 20, 21 further contains a control device 50. The control device 50 is configured to control the monolithic microwave integrated circuit 30 so that it performs at least one of the basic operations. Conversely, the control device 50 is configured to control the mass storage element 40 so that it provides or stores the transfer data respectively to or from the monolithic microwave integrated circuit 30.

In another non-illustrated example, the control device 50 is configured to allow the mass storage element 40 to store or send data from or to a data management device D1, D2.

The control device 50 is for example a microcontroller. The data processing speed of the controlling device 50 is greater than 1 Gigabit per second and typically greater than 6 Gigabit per second in order to maintain overall data transfer speed.

In an example, as mentioned above, the mass storage element 40 of each transfer module 20, 21 may be different from the non-volatile memory belonging to the data management device D1, D2 to which said transfer module 20, 21 is able to be connected. In a development of this example, the control device 50 of said transfer module 20, 21 has no access to said non-volatile memory 100, each transfer module 20, 2) being configured so that its mass storage element

40 is accessible by a data selection device 90, 91 belonging to said data management device D1, D2 or to said transfer module 20, 21. The data selection device 90, 91 also has access to said non-volatile memory (100) when said transfer module (20, 21) and said data management device (D1, D2) are connected. This makes it possible to ensure the exchange of the transfer data between a pair of data management device D1, D2 and transfer module 20, 21, while prohibiting the control device 50 from allowing the monolithic microwave integrated circuit to integrate data other than the transfer data in the microwave radio signals: the security of the data which are not to be transferred from the corresponding data management device D1, D2 is improved. For example, the only interactions permitted between the non-volatile memory 100 of a data management device D1, D2 and the mass storage element 40 of the transfer module 20, 21 connected to said data management device D1, D2 are controlled by the data selector 90, 91 to prevent wireless high-speed transfer of data other than the transfer data.

Each transfer module 20, 21 further contains a communication bus 60 connected to the mass storage element 40. The communication bus 60 is able to allow connection of the transfer module 20, 21 to a data management device D1, D2 in order to allow an exchange of data between these two elements. The communication bus 60 can, in a non-illustrated example, be controlled by the control device 50. The communication bus 60 is capable of passing the transfer data from the mass storage element 40 to the data management device D1, D2 and vice versa from the data management device D1, D2 to the mass storage element 40. The transfer speed between the transfer module 20, 21 and the data management device D1, D2 can be lower than 1 Gigabit per second. Indeed, the user can, in a first step, load the transfer data to the mass storage element 40 of one of the transfer modules 20, 21 with a first speed lower than 1 Gigabit per second. The transfer module 20, 21 can then optionally be disconnected from the data management device D1, D2 and reconnected later or to another data management device D1, D2. In a subsequent step, the data stored in this transfer module 20, 21 are sent at a high speed greater than 1 Gigabit per second via microwave radio signals to a second transfer module 20, 21. In a subsequent step, the data received by the second transfer module 20, 21 can be transferred at a speed lower than 1 Gigabit per second to the data management device D1, D2 to which the second transfer module 20, 21 is connected.

In an example of implementation illustrated in FIG. 1, an electrical power supply device 70 is arranged internally to at least one of the transfer modules 20, 21. In this example, said at least one of the first and second transfer modules 20, 21 is electrically powered by the electrical power supply device 70. The electrical power supply device 70 can be a battery, an electric battery, a capacitance, a capacitor, a supercapacitor or else an autonomous device or not energy recovery.

Figure 3:
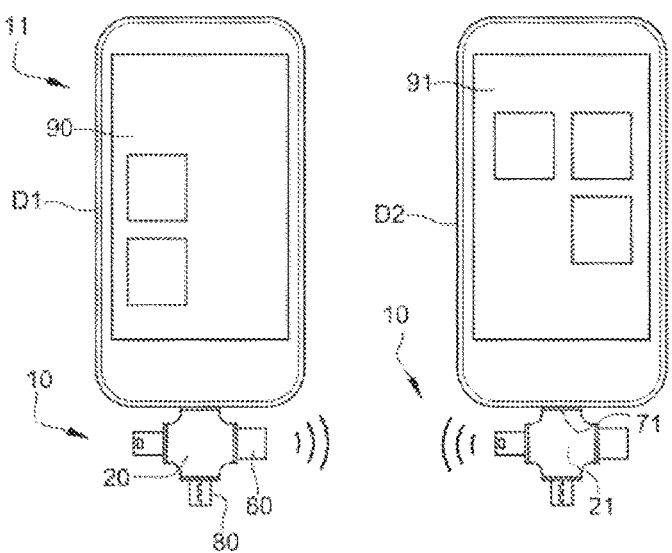
FIG. 3 illustrates a schematic view of a high-speed wireless data transfer system comprising a high-speed wireless data transfer device according to the disclosure having two transfer modules each connected externally to a different data management device.

In an additional example of implementation illustrated in FIG. 3, at least one of the transfer modules 20, 21 is configured to be electrically powered by an electrical power supply device 71 external to said transfer module 20, 21. The external power supply 71 can come, in the example illustrated in FIG. 3, from a data management device D1, D2 to which the transfer module 20, 21 is connected. A port, for example of the USB type, may be suitable for constituting an external power supply device 71. More particularly, the external power supply device 71 comes from the data management device D1, D2 to which the transfer module 20, 21 is electrically connected.

Figure 2:
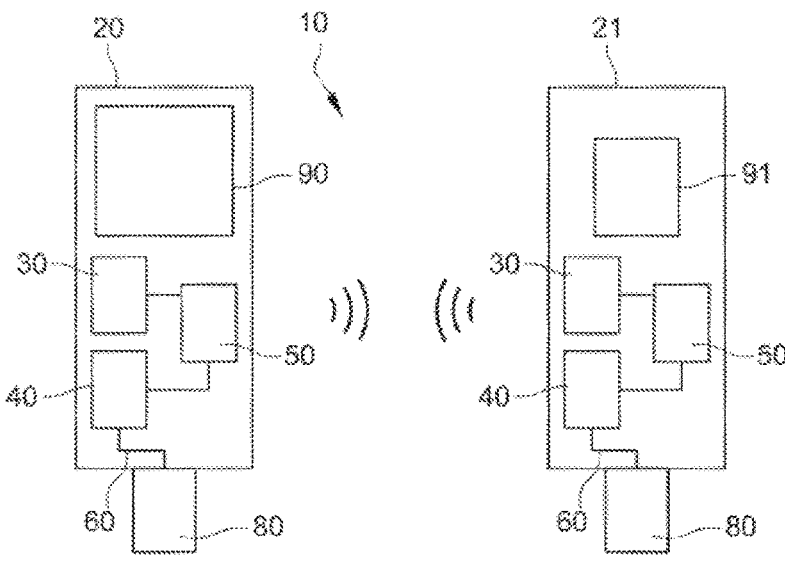
FIG. 2 illustrates a schematic view of a high-speed wireless data transfer device according to the disclosure having two transfer modules each with a data selection device.

In an embodiment illustrated in FIGS. 2 and 3, each of the transfer modules 20, 21 comprises at least one communication port 80. The communication port 80 is able to be connected to a data management device D1, D2. It allows the transfer data to pass between the communication bus 60 and the data management device D1, D2 on which the communication port 80 of said transfer module 20, 21 is connected. It can also enable the power supply coming from the data management device D1, D2 to which the transfer module 20, 21 is connected.

In an example illustrated in FIG. 3, the communication port 80 is of the micro-USB type or of the USB 3.0 type or of the Lightning© type or else of the USB-C type.

In an example of implementation illustrated in FIG. 3, each of the transfer modules 20, 21 comprises a first communication port 80 of the micro-USB type, a second communication port 80 of the USB 3.0 type, a third communication port 80 of the Lightning© type and a fourth 80 communication port of the USB-C type. This allows an advantageous adaptation of the transfer modules 20, 21 to numerous types of data management devices D1, D2. At the same time, this makes it possible to limit the costs because the power supply is then not internal to the transfer modules 20, 21.

More generally, each of the transfer modules 20, 21 can include several communication ports 80 of different types in order to increase the compatibility of these transfer modules 20, 21 with different data management devices D1, D2.

In an example of implementation, at least one of the transfer modules 20, 21 is configured to be connected externally to one of the data management devices D1, D2. In this sense, said at least one of the transfer modules 20, 21 can be a peripheral external to the data management device D1, D2 corresponding to which it is intended to be connected by means of its communication port 80 or of one of its communication ports 80. This makes it possible, for example, to make a data management device D1, D2 compatible with a high-speed wireless data transfer.

For example, each of the first and second transfer modules 20, 21 is configured to operate as an external peripheral of one of the data management devices D1, D2, respectively called first data management device D1 and second management device data D2, to which it is intended to be connected via its communication port 80 or one of its communication ports 80. This has the advantage that the first transfer module 20 can be connected, via its communication port 80 or one of its communication ports 80, to the first data management device D1 and that the second transfer module 21 can be connected, via its communication port 80 or one of the communication ports 80, to the second data management device D2 to in fine allow, via the first and second transfer modules 20, 21, the transfer of the transfer data between the first and second data management devices D1, D2. This example is particularly illustrated in FIG. 3.

Figure 4:
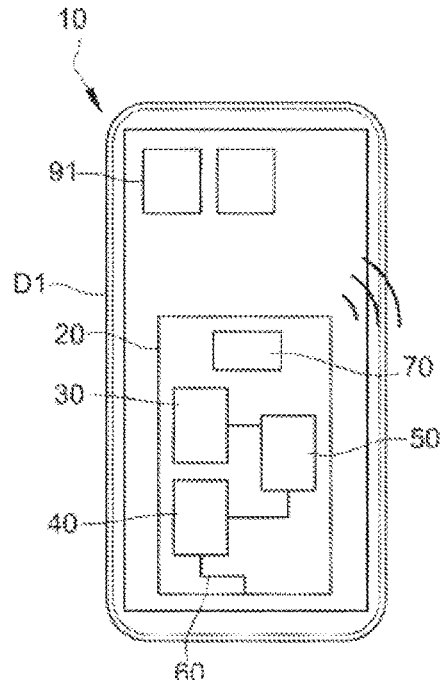
FIG. 4 illustrates a schematic view of a high-speed wireless data transfer device according to the disclosure having one of the two transfer modules arranged inside a data management device.

In an example of implementation illustrated in FIG. 4, at least one transfer module 20, 21 of the high-speed wireless data transfer device 10 selected among the first transfer module 20 and the second transfer module 21 is arranged inside a data management device D1, D2. The other transfer module 20, 21 of the high-speed wireless data transfer device 10 can be arranged outside another data management device D1, D2 as in FIG. 5 inside another data management device D1, D2. The data transfer then takes place by bringing the two data management devices D1, D2 closer together, a few centimetres apart.

In an implementation of the high-speed wireless data transfer device 10, the first transfer module 20 and the second transfer module 21 are configured to pair with each other. This has the advantage that a wired connection of the USB type (for «Universal Serial Bus» and corresponding to a computer bus) is not necessary prior to the implementation of the pairing between the first transfer module 20 and the second transfer module 21.

In an implementation of the high-speed wireless data transfer device 10, the first transfer module 20 and the second transfer module 21 are configured to pair with each other without any wired connection being established beforehand between the first transfer module 20 and the second transfer module 21. This has the advantage that a wired connection of the USB type is not necessary prior to the implementation of the pairing between the first transfer module 20 and the second transfer module 21.

In an implementation of the high-speed wireless data transfer device 10, the first transfer module 20 and the second transfer module 21 are configured to pair with each other without either the first transfer module 20 or the second transfer module 21 is physically connected, before pairing or at the time of pairing, to a data management device D1, D2.

According to an embodiment of the high-speed wireless data transfer device 10, the first and second transfer modules 20, 21 are configured to autonomously establish a wireless link between them when the transfer data have to be transferred and when the first and second transfer modules 20, 21 are separated by a distance less than the predetermined distance. Thus, the high-speed wireless data transfer device 10 does not need to have recourse to a specific configuration of the wireless link of its transfer modules 20, 21 which would be established by one or more data management devices D1, D2. In other words, the wireless link between the first and second transfer modules 20, 21 can be established automatically and independently of an interaction between these transfer modules 20, 21 and one or more data management devices D1, D2 to configure the wireless link between the transfer modules 20, 21. The high-speed wireless data transfer device 10 therefore independently manages the transfer of wireless data between its transfer modules 20, 21. This allows easy implementation of the transfer of transfer data. By way of illustration, when the transfer data must be transferred, the transfer modules 20, 21 behave like two ports to which a communication cable would be connected, except that one of the transfer modules 20, 21 decides to contact the other of the transfer modules 20, 21 by creating a wireless communication link to authorize the transfer of the transfer data to this other of the transfer modules 20, 21.

The disclosure relates secondly to a high-speed wireless data transfer system 11 for data management devices D1, D2. As illustrated in FIG. 3, the high-speed wireless data transfer system 11 comprises at least one high-speed wireless data transfer device 10 as defined above. The first transfer module 20 of the high-speed wireless data transfer device 10 is connected at least via its communication bus 60 to a first data management device D1. The second transfer module 21 of the high-speed wireless data transfer device 10 is connected to a second data management device D2 or to a power supply device 70.

The high-speed wireless data transfer system 11 further comprises a first data selection device 90. The first data selection device 90 can be, for example, an application, a processing and/or classification and/or file display system and/or an internet browser. The first data selection device 90 can, in one example, consist of the file management system or the native operating system of the data management device D1, D2.

The first data selection device 90 is configured to carry out a primary data selection among a general set of data or files of the first data management device D1. The terms «primary», «secondary» or «tertiary», correspond only to a numbering and do not imply links of subordination between the different selections. The data of the primary selection can thus pass from the first data management device D1 to the mass storage element 40 of the transfer module, corresponding in particular to the first transfer module 20, via the communication bus 60.

The first data selection device 90 further allows a secondary selection of transfer data from a set of transfer data or files stored on the mass storage element 40 of the first transfer module 20. The transfer data of the secondary selection can thus pass from the mass storage element 40 of the first transfer module 20 to the first data management device D1 via the communication bus 60 of the first transfer module 20. In other words, the secondary selection is the selection by a user of data ready to be transferred. For example, the secondary selection may consist of choosing files to be transferred and putting them in a directory dedicated to immediate transfer. Thus, within the first data selection device 90, different data directories can cohabit a specific directory of which is dedicated to the wireless transfer of data to another transfer module. It can be provided that as soon as the data are placed in this specific directory, the transfer of the data takes place automatically wirelessly to the other transfer module via in particular the microwave radio signals.

In an example, the first data selection device 90 interacts directly or indirectly with the control device 50 of the first transfer module 20 to control the mass storage element 40 and the monolithic microwave integrated circuit 30 of the first transfer module 20 so that the transfer data resulting from the secondary selection, and stored in the mass storage element 40, are transmitted by microwave radio signals to the second transfer module 21 with a rate greater than 1 Gigabit per second. This data transfer only takes place when the distance between the first transfer module 20 and the second transfer module 21 is less than 30 cm and more particularly less than 10 cm. This corresponds to the predetermined distance mentioned above.

The first data selection device 90 further enables the transfer data coming from the first transfer module 20 to be received and processed by the monolithic microwave integrated circuit 30 of the second transfer module 21 and stored in the mass storage 40 of the second transfer module 21. These data can subsequently be downloaded or dumped to another data management device to which the second transfer module 21 would be connected.

In an example of implementation, the second transfer module 21 is connected to the second data management device D2 at least via its communication bus 60. The transfer system 11 also comprises a second data selection device 91. This latter is configured so that a tertiary selection of transfer data is possible among a set of transfer data stored on the mass storage element 40 of the second transfer module 21.

The second data selection device 91 is also configured so that the transfer data of the tertiary selection can pass from the mass storage element 40 of the second transfer module 21 to the second data management device D2 via the bus communication 60 of the second transfer module 21.

Thus, the transfer data initially stored in a first data management device D1 are selected and transferred in the first transfer module 20. Then they are sent by electric radio signals to the second transfer module 21 which stores them. Finally, the transfer data can be selected and moved from the second transfer module 21 to the second data management device D2.

In an example, at least one of the data selection devices 90, 91 is installed on the first data management device D1 and/or the second data management device D2 and/or on the first transfer module 20 and/or on the second transfer module 21.

In an example, a screen is provided on at least one of the transfer modules 20, 21 in order to visualize in situ the data present on said transfer module 20, 21.

In an example intended to improve the security of data other than the transfer data, the data transfer system may be such that access to the general set of data of the first data management device D1 is prohibited to the control device 50 of the first transfer module 20. In other words, the first data selection device 90 can be configured to:

access the non-volatile memory 100 belonging to the first data management device D1, this non-volatile memory 100 including the general data set of the first data management device D1;

access the mass storage element 40 of the first transfer module 20 to allow the storage of the primary selection of data;

access the mass storage element 40 of the first transfer module 20 to recover transfer data, for example transmitted from the second transfer module 21 (see in particular in this sense FIG. 6) and/or transfer data from the first data management device D1.

Figure 5:
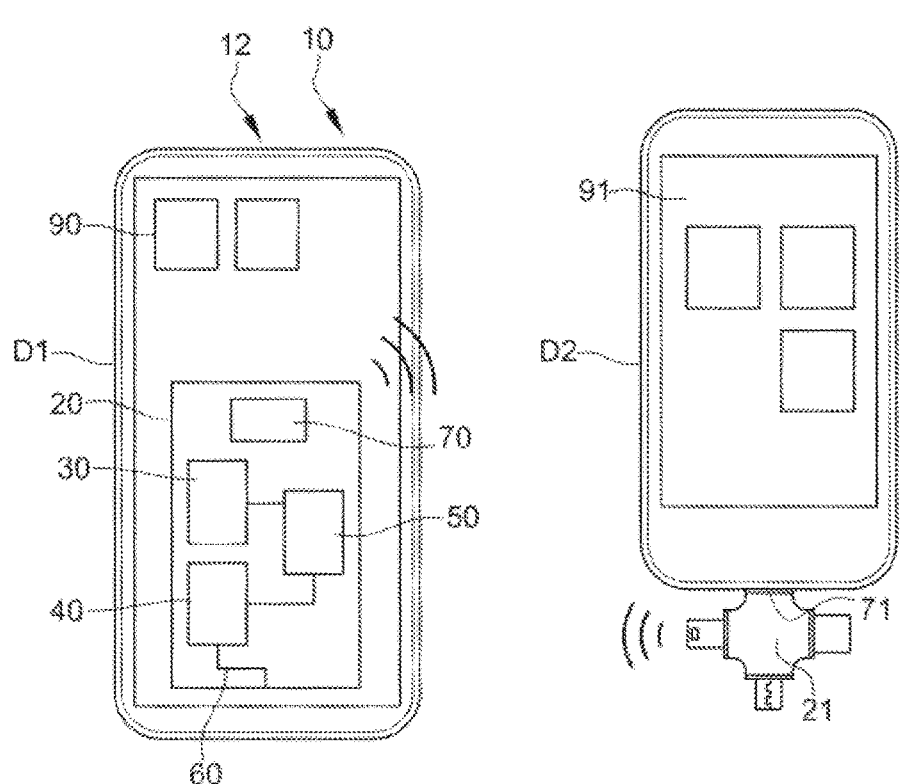
FIG. 5 illustrates a schematic view of a high-speed wireless data transfer assembly comprising a data management device and a high-speed wireless data transfer device according to the disclosure whose one of the two transfer modules is arranged inside the data management device.

The disclosure relates thirdly to a high-speed wireless data transfer assembly 12, an example of which is illustrated in FIG. 5.

This high-speed wireless data transfer assembly 12 comprises at least one first data management device D1.

The high-speed wireless data transfer assembly 12 also comprises at least one high-speed wireless data transfer device 10 as described above. A first transfer module of the high-speed wireless data transfer device 10 is then arranged inside said first data management device D1 so that the communication bus 60 of the first transfer module 20 is connected with said first data management device D1. The electric power supply of the transfer module 20 is then preferably ensured by the data management device D1.

As illustrated in FIG. 5, the second transfer module 21 of the high-speed wireless data transfer device 10 can for example be arranged externally to a second data management device D2 which does not belong to the high-speed wireless data transfer assembly 12.

In a non-illustrated example of implementation, the high-speed wireless data transfer assembly 12 comprises a second data management device D2, in which the second transfer module 21 of the high-speed wireless data transfer device 10 is arranged in said second data management device D2. This is advantageous for reducing costs because there is no longer any need for connectors.

In an example, at least one of the transfer modules is manufactured in a specific integrated circuit otherwise known as an ASIC for «Application specific integrated circuit». This saves space and facilitates integration.

Everything that has been described in the present description can be applied to a data transfer method between the first data management device D1 connected to the first transfer module 20 and the second transfer module 21.

In particular, the data transfer method between the first data management device connected to the communication bus 60 belonging to the first transfer module 20 and the second transfer module 21 including a communication bus 60 able to allow a connection of the second transfer module 21 to a second data management device D2, includes the following steps:

a step in which the transfer data pass, via the communication bus 60 of the first transfer module 20, from the first data management device D1 to the mass storage element 40 to store the transfer data in said element mass storage element 40 of the first transfer module 20, said mass storage element 40 of the first transfer module 20 being connected to the communication bus 60 of the first transfer module 20;

a step of supplying the transfer data, with a rate greater than 1 gigabit per second, from the mass storage element 40 of the first transfer module 20 to the monolithic microwave integrated circuit 30 belonging to the first transfer module transfer 20;

a modulation step, carried out with a rate greater than 1 gigabit per second, of said microwave radio signals by the monolithic microwave integrated circuit 30 of the first transfer module 20, the monolithic microwave integrated circuit 30 of the first transfer module transfer 20 integrating, during the modulation step, the transfer data coming from the mass storage element 40 of the first transfer module 20 in the microwave radio signals;

a high-speed wireless transmission step, in particular via the corresponding antenna 31, carried out with a rate greater than 1 gigabit per second, microwave radio signals modulated by the modulation step, the transmission step being implemented by the monolithic microwave integrated circuit 30 belonging to the first transfer module 20;

a step of receiving, in particular via the corresponding antenna 31, microwave radio signals transmitted during the transmitting step by the monolithic microwave integrated circuit 30 belonging to the second transfer module 21, the reception step being carried out with a rate greater than 1 gigabit per second;

a demodulation step, implemented by the monolithic microwave integrated circuit 30 of the second transfer module 21, of the received microwave radio signals, the demodulation step being carried out with a rate greater than 1 gigabit per second;

an extraction step, implemented by the monolithic microwave integrated circuit 30 of the second transfer module 21 during the demodulation step, of the transfer data of said microwave radio signals received so that the transfer data are usable by the mass storage element 40 belonging to the second transfer module 21, the mass storage element 40 of the second transfer module 21 being connected to the communication bus 60 of the second transfer module 21;

a step of storing the transfer data, coming from the monolithic microwave integrated circuit of the second transfer module 21, in the mass storage element 40 of the second transfer module 21 with a rate greater than 1 gigabit per second;

during the transmission step and during the reception step, the first and second transfer modules 20, 21 are positioned relative to each other at a separation distance less than the predetermined distance. Here, the first and second transfer modules 20, 21 each include a mass storage element 40 dedicated solely to the storage of the transfer data. The advantages of such a transfer method result from what has been described previously. In particular, here the control device 50 of the first transfer module 20 can control the implementation of the supplying, modulation, transmission steps for the first transfer module and the control device 50 of the second transfer module 21 can control the implementation of the reception, demodulation, extraction and storage steps.

If the second data management device D2 is connected to the communication bus 60 of the second transfer module 21 then the transfer method can also allow the transfer data to be communicated to the second data management device D2: in this case the transfer method includes a step in which the transfer data pass, via the communication bus 60 of the second transfer module 21, from the mass storage element 40 of the second transfer module 21 to the second data transfer management device D2. Alternatively, the transfer data being stored in the mass storage element 40 of the second transfer module 21, their transfer to the second data management device D2 can be done later when it can be connected to the communication bus 60 of the second transfer module 21.

In particular, the data transfer method may be such that, prior to the step in which the transfer data pass from the first data management device D1 to the mass storage element 40 of the first transfer module 20, the transfer data are selected, for example by the data selection device 90, in the non-volatile memory 100 belonging to the first data management device D1 and different from the mass storage element 40 (FIG. 6), this non-volatile memory 100 being preferentially inaccessible by the control device 50 of the first transfer module 20. This makes it possible to improve the security of the data of the first data management device D1 other than the transfer data in order to avoid their transfer via the first transfer module 21.

If the second data management device D2 is connected to the connection bus 60 of the second transfer module 21 during the implementation of the transfer method, the transfer method may include a step of storing the transfer data passing from the mass storage element 40 of the second transfer module 21 to the second data management device D2 in a non-volatile memory 100 of the second data management device D2 (FIG. 6).

The principle according to which it is the first transfer module 20 which sends the transfer data and the second transfer module 21 which receives the transfer data has been described above. Of course, the second transfer module 21 can also be a transmitter and the first transfer module can be a receiver in this case.

The invention claimed is:

1. A high-speed wireless data transfer device for data management devices, comprising a first transfer module and a second transfer module (21), able to exchange wirelessly between them, by microwave radio signals with a frequency greater than 50 Gigahertz, transfer data with a transfer rate greater than 1 Gigabit per second when the distance separating the first transfer module and the second transfer module transfer is less than a predetermined distance, each transfer module comprising:

a monolithic microwave integrated circuit capable of carrying out at least one basic operation among a modulation of said microwave radio signals, a demodulation of said microwave radio signals, a transmission of said microwave radio signals and a reception of said microwave radio signals via an antenna, respectively to or from, a different transfer module selected among the first transfer module and the second transfer module, said at least one basic operation being carried out with a rate greater than 1 gigabit per second;

at least one mass storage element capable of supplying or storing the transfer data respectively to or from the monolithic microwave integrated circuit with a rate greater than 1 gigabit per second, said element mass storage being dedicated to the only storage of the transfer data;

the monolithic microwave integrated circuit on the one hand integrating, during the basic operation of modulating said microwave radio signals, the transfer data coming from the mass storage element in the microwave radio signals and on the other hand extracting the transfer data from said microwave radio signals during the basic operation of demodulating the microwave radio signals, so that the transfer data are usable by the mass storage;

a control device configured to control on the one hand the monolithic microwave integrated circuit so that it carries out at least one of the basic operations and on the other hand the mass storage element to provide or to store the transfer data respectively to or from the monolithic microwave integrated circuit; and a communication bus connected to the mass storage element, able to allow connection of said transfer module to a data management device and able to pass the transfer data from the mass storage element to the data management device and from the data management device to the mass storage element.

2. The high-speed wireless data transfer device according to claim 1, wherein the mass storage element is a NAND type memory.

3. The high-speed wireless data transfer device according to claim 1, further including a power supply device arranged internally to at least one of the first and second modules, at least one of the first and second transfer modules being electrically powered by the power supply device.

4. The high-speed wireless data transfer device according to claim 1, wherein at least one of the transfer modules is configured to be electrically powered by a power supply device external to said transfer module and coming from a data management device.

5. The high-speed wireless data transfer device according to claim 1, wherein each of the transfer modules comprises at least one communication port able to be connected to a data management device and configured to pass the transfer data between the communication bus and the data management device on which the communication port is connected.

6. The high-speed wireless data transfer device according to claim 5, wherein each of the transfer modules comprises a first communication port of a micro-USB-type, a second communication port of a USB 3.0, a third communication port of a Lightning© and a fourth communication port of a USB-C.

7. The high-speed wireless data transfer device according to claim 1, wherein the modulation of the microwave radio signals and the demodulation of the microwave radio signals are carried out according to a protocol of amplitude shift modulation.

8. The high-speed wireless data transfer device according to claim 1, wherein the frequency of the microwave radio signals is 60 GHz.

9. The high-speed wireless data transfer device according to claim 1, wherein at least one of the transfer modules selected among the first transfer module and the second transfer module is arranged inside one of the data management devices.

10. The high-speed wireless data transfer device according to claim 1, wherein the mass storage element of each transfer module is different from a non-volatile memory belonging to the data management device to which said transfer module is able to be connected, the control device of said transfer module having no access to said non-volatile memory, each transfer module being configured so that its the mass storage element is accessible by a data selection device belonging to said data management device or to said transfer module, the data selection device also having access to said non-volatile memory when said transfer module and said data management device are connected.

11. The high-speed wireless data transfer device according to claim 1, wherein the mass storage element has a capacity greater than or equal to 64 GB.

12. The high-speed wireless data transfer device according to claim 1, wherein the first and second transfer modules are configured to autonomously establish a wireless link between the first and second transfer modules when the transfer data have to be transferred and when the first and second transfer modules are separated by a distance less than the predetermined distance.

13. A high-speed wireless data transfer assembly comprising at least one first data management device and at least one high-speed wireless data transfer device according to claim 12, wherein the first transfer module is arranged inside said first data management device so that the communication bus of the first transfer module is connected with said first data management device.

14. The high-speed wireless data transfer assembly according to claim 13, further comprising a second data management device, wherein the second transfer module of the high-speed wireless data transfer device is arranged in said second data management device.

15. A high-speed wireless data transfer system for data management devices, comprising:

at least one high-speed wireless data transfer device according to claim 1, whose first transfer module is connected at least via its communication bus to a first data management device and whose second transfer module is connected to at least one device selected among a second data management device and a power supply device;

a first data selection device configured:

to perform a primary selection of data from a general set of data of the first data management device;

so that the data of the primary selection can pass from the first data management device to the mass storage element of the first transfer module via the communication bus;

to perform a secondary selection of transfer data from a set of transfer data stored on the mass storage element of the first transfer module;

so that the transfer data of the secondary selection can pass from the mass storage element of the first transfer module to the first data management device via the communication bus the first transfer module;

so that the control device of the first transfer module control the mass storage element and the monolithic microwave integrated circuit of the first transfer module so that the transfer data resulting from the secondary selection and stored in the mass storage element of the first transfer module are transmitted by microwave radio signals to the second transfer module with a higher rate at 1 Gigabit per second; and so that the transfer data coming from the first transfer module are received and processed by the monolithic microwave integrated circuit of the second transfer module and stored in its mass storage element.

16. The data transfer system according to claim 15, wherein the second transfer module is connected to the second data management device at least via its the communication bus, the data transfer system comprising a second data selection device configured:

so that a tertiary selection of transfer data is possible among a set of transfer data stored on the mass storage element of the second transfer module; and so that the transfer data of the tertiary selection can pass from the mass storage element of the second transfer module to the second data management device via the communication bus of the second transfer module.

17. The data transfer system according to claim 16, wherein at least one of the data selection devices is installed on at least one of the first data management device, the second data management device, the first transfer module and the second transfer module.

18. The data transfer system according to claim 13, wherein access to the general set of data of the first data management device is prohibited to the control device of the first transfer module.

19. A method for transferring data between a first data management device, connected to a communication bus belonging to a first transfer module, and a second transfer module including a communication bus able to allow connection of the second transfer module to a second data management device, the first and second transfer modules being able to exchange wirelessly at high speed between the first and second transfer modules, by microwave radio signals with a frequency greater than 50 Gigahertz, transfer data with a transfer rate greater than 1 Gigabit per second when the distance separating the first transfer module and the second transfer module is less than a predetermined distance, the first and second transfer modules each including a mass storage element dedicated to the only storage of the transfer data, the transfer method including the following steps:

a step in which the transfer data pass, via the communication bus of the first transfer module, from the first data management device to the mass storage element for storing the transfer data in said mass storage element of the first transfer module, said mass storage element of the first transfer module being connected to the communication bus of the first transfer module, a step of supplying the transfer data, with a rate greater than 1 gigabit per second, from the mass storage element of the first transfer module to a monolithic microwave integrated circuit belonging to the first transfer module, a modulating step, carried out with a rate greater than 1 gigabit per second, of said microwave radio signals by the monolithic microwave integrated circuit of the first transfer module, the monolithic microwave integrated circuit of the first transfer module integrating, during the modulation step, the transfer data coming from the mass storage element of the first transfer module into the microwaves radio signals, a high-speed wireless transmission step, carried out with a rate greater than 1 gigabit per second, microwave radio signals modulated by the modulation step, the transmission step being implemented by the monolithic microwave integrated circuit belonging to the first transfer module, a step of receiving the microwave radio signals emitted during the step of transmitting by a monolithic microwave integrated circuit belonging to the second transfer module, the receiving step being carried out with a speed greater than 1 gigabit per second, a demodulation step, implemented by the monolithic microwave integrated circuit of the second transfer module, of the received microwave radio signals, the demodulation step being carried out with a rate greater than 1 gigabit per second, an extraction step, implemented by the monolithic microwave integrated circuit of the second transfer module during the demodulation step, of the transfer data of said received microwave radio signals so that the transfer data are usable by the mass storage element belonging to the second transfer module, the mass storage element of the second transfer module being connected to the communication bus of the second transfer module, and a step of storing the transfer data, coming from the monolithic microwave integrated circuit of the second transfer module, in the mass storage element of the second transfer module with a higher rate at 1 gigabit per second;

during the transmission step and during the reception step, the first and second transfer modules are separated from each other by a separation distance less than the predetermined distance.

20. The data transfer method according to claim 19, wherein, prior to the step in which the transfer data pass from the first data management device to the mass storage element of the first transfer module, the transfer data are selected in a non-volatile memory belonging to the first data management device and different from the mass storage element.

* * * * *